US010808474B2

(12) United States Patent
Ruehmann et al.

(10) Patent No.: US 10,808,474 B2
(45) Date of Patent: Oct. 20, 2020

(54) METHOD AND SYSTEM FOR EVALUATING TUBULAR MAKEUP

(71) Applicant: Weatherford Technology Holdings, LLC, Houston, TX (US)

(72) Inventors: Rainer Ruehmann, Hannover (DE); David Geissler, Hannover (DE); Benjamin Sachtleben, Hannover (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 15/792,592

(22) Filed: Oct. 24, 2017

(65) Prior Publication Data

US 2019/0119998 A1 Apr. 25, 2019

(51) Int. Cl.
*E21B 19/16* (2006.01)
(52) U.S. Cl.
CPC .......... *E21B 19/166* (2013.01); *E21B 19/161* (2013.01)
(58) Field of Classification Search
CPC ............................. E21B 19/161; E21B 19/166
USPC ...................................................... 166/77.51
See application file for complete search history.

(56) References Cited

U.S. PATENT DOCUMENTS

| 4,091,451 | A | * | 5/1978 | Weiner | B23P 19/06 |
| | | | | | 700/275 |
| 4,210,017 | A | * | 7/1980 | Motsinger | B25B 23/14 |
| | | | | | 702/41 |
| 4,365,402 | A | | 12/1982 | McCombs et al. | |
| 7,757,759 | B2 | | 7/2010 | Jahn et al. | |
| 8,042,432 | B2 | | 10/2011 | Hunter et al. | |
| 2004/0144547 | A1 | * | 7/2004 | Koithan | E21B 19/07 |
| | | | | | 166/380 |
| 2004/0154832 | A1 | * | 8/2004 | Koithan | E21B 19/166 |
| | | | | | 175/26 |
| 2005/0092143 | A1 | | 5/2005 | Lehnert et al. | |
| 2009/0126536 | A1 | | 5/2009 | Begnaud et al. | |
| 2012/0273230 | A1 | * | 11/2012 | Patterson | E21B 19/165 |
| | | | | | 166/377 |

(Continued)

FOREIGN PATENT DOCUMENTS

GB 2033089 A 5/1980
WO 2008028302 A1 3/2008

OTHER PUBLICATIONS

PCT International Search Report and Written Opinion dated Apr. 2, 2019, for International Application No. PCT/US2018/057381.

*Primary Examiner* — Taras P Bemko
(74) *Attorney, Agent, or Firm* — Patterson + Sheridan, LLP

(57) ABSTRACT

Methods and systems for connecting threaded tubulars are presented. One example method generally includes engaging threads of the tubulars; engaging the first tubular with a clamp of a makeup tool; rotating the clamp of the makeup tool, thereby rotating the first tubular relative to the second tubular and making up the threaded connection; measuring turns of the first tubular; measuring turns of the clamp; and evaluating the threaded connection by comparing the measured turns of the first tubular and the measured turns of the clamp. One example system generally includes a makeup tool operable to rotate a first threaded tubular relative to a second threaded tubular. The makeup tool includes a clamp configured to engage the first tubular. The tubular makeup system further includes a first turns counter configured to measure turns of the first tubular; and a second turns counter configured to measure turns of the clamp.

18 Claims, 9 Drawing Sheets

(56) References Cited

U.S. PATENT DOCUMENTS

2016/0186510 A1\* 6/2016 Vestersjo ............... E21B 19/24
166/250.01

\* cited by examiner

METHOD AND SYSTEM FOR EVALUATING TUBULAR MAKEUP

BACKGROUND

Field of the Invention

The present disclosure generally relates to method and systems for evaluating a tubular makeup.

Description of the Related Art

Construction of oil or gas wells usually requires making long tubular strings that make up casing, risers, drill pipe, or other tubing. Due to the length of these strings, sections or joints of tubulars are progressively added to or removed from the tubular strings as they are lowered or raised from a drilling platform. Tongs are devices used on oil and gas rigs for gripping and/or rotating tubular members, such as casing, drill pipe, drill collars, and coiled tubing (herein referred to collectively as tubulars and/or tubular strings). Tongs may be used to make-up or break-out threaded joints between tubulars. Tongs typically resemble large wrenches, and may sometimes be referred to as power tongs, torque wrenches, spinning wrenches, and/or iron roughnecks. Tongs typically use hydraulic power to provide sufficiently high torque to make-up or break-out threaded joints between tubulars.

A drilling rig is constructed on the earth's surface or floated on water to facilitate the insertion and removal of tubular strings (e.g., drill pipe, casing, sucker rod, riser, or production tubing) into a wellbore. The drilling rig includes a platform and power tools, such as an elevator and slips, to engage, assemble, and lower the tubulars into the wellbore. The elevator is suspended above the platform by a draw works that can raise or lower the elevator in relation to the floor of the rig. The slips are mounted in the platform floor. The elevator and slips are each capable of engaging and releasing a tubular and are designed to work in tandem. Generally, the slips hold a tubular or tubular string that extends into the wellbore from the platform. The tubular or tubular string includes a tubular coupling configured to receive the next tubular to be madeup with the tubular string. The elevator engages a tubular joint and aligns it over the tubular string being held by the slips. One or more makeup tools, e.g. a power tong and a spinner, are then used to thread the joint and the string together at the tubular coupling. Once the tubulars are joined, the slips disengage the tubular string and the elevator lowers the tubular string through the slips until the elevator and slips are at a predetermined distance from each other. The slips then reengage the tubular string and the elevator disengages the string and repeats the process. This sequence applies to assembling tubulars for the purpose of drilling, deploying casing, or deploying other components into the wellbore. The sequence is reversed to disassemble the tubular string.

The one or more makeup tools engage the tubulars and rotate the tubulars relative to each other. The one or more makeup tools use clamps to engage the tubulars. During makeup, the one or more makeup tools can lose clamping force. Loss of clamping force can result in rotation of the clamp relative to the associated engaged tubular, also known as slippage. For example, slippage can occur between a power tong of the one or more makeup tools and the tubular being added to the tubular string. Loss of clamping force can also result in rotation and slippage of the tubular string relative to a backup tong of the one or more makeup tools configured to engage and hold the tubular string. Slippage can also occur at the tubular coupling due to insufficient mill side makeup of the tubular coupling and the last tubular joint added to the tubular string. Current systems measure only the turns of the clamp during the makeup operation which does not account for all forms of slippage. Therefore, there is a need for new and improved methods for evaluating tubular makeup.

SUMMARY

The present disclosure generally relates to methods and system for evaluating a tubular makeup.

According to one embodiment, a tubular makeup system is provided. The tubular makeup system generally includes a makeup tool operable to rotate a first threaded tubular relative to a second threaded tubular. The makeup tool generally includes a clamp configured to: engage the first tubular; and rotate relative to the second tubular. The system also includes a first turns counter configured to measure turns of the first tubular and a second turns counter configured to measure turns of the clamp. The system also includes a programmable logic controller (PLC) operably connected to the makeup tool and communicatively coupled to the first turns counter and the second turns counter. The PLC is configured to control an operation, generally including: engaging threads of the tubulars; engaging the first tubular with the clamp; rotating the clamp, thereby rotating the first tubular relative to the second tubular and making up a threaded connection; during makeup of the threaded connection, measuring turns of the first tubular and measuring turns of the clamp; and evaluating the threaded connection by comparing the measured turns of the first tubular and the measured turns of the clamp.

According to another embodiment, a tubular makeup system is provided. The tubular makeup system generally includes a makeup tool operable to rotate a first tubular relative to a second tubular. The makeup tool generally includes a clamp configured to engage the first tubular. The tubular makeup system also generally includes a first turns counter configured to measure turns of the first tubular and a second turns counter configured to measure turns of the clamp.

According to yet another embodiment, a method of connecting a first threaded tubular to a second threaded tubular is provided. The method generally includes engaging threads of the tubulars; engaging the first tubular with a clamp of a makeup tool; rotating the clamp of the makeup tool, thereby rotating the first tubular relative to the second tubular and making up the threaded connection; measuring turns of the first tubular; measuring turns of the clamp; and evaluating the threaded connection by comparing the measured turns of the first tubular and the measured turns of the clamp.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Aspects of the present disclosure generally relate to evaluation of tubular makeup. For example, tubular makeup can include use of power tongs. However, the aspects of this disclosure for evaluation of tubular makeup are not limited to this system, but could be used for evaluation of tubular makeup in any system. The power tongs (or other system) may include turns counters to measure turns of the threaded tubulars, tubular couplings, and clamps of the power tongs during the tubular makeup (or other connections, such as casing, etc., during a makeup process). The turns counters may be in communication with a remote processing system, which may be on-site, in a nearby operator room, or off-site.

The remote processing system may be used to analyze the measurements, such as turns measurements by the turns counters during a tubular makeup. The remote processing system may perform such functions as providing outputting information to a display, such as graphical representations of turns, alerts or status message to an operator related to quality of the connections in the system, or even automated control of the system based on the measurements. In some cases, the remote processing system uses other processing systems, clients, or programs to perform some of the functions described above. In some cases, the remote processing system is operated by, or takes some input from, an operator or technician. FIGS. 1A-3B below illustrate one example of a tubular makeup system in communication with a processing system with a graphical evaluator, in which aspects of the present disclosure may be applied.

Techniques and apparatus are provided herein for evaluation of tubular makeup, which may reduce errors in threaded connections.

Example Graphical Evaluator for Tubular Makeup

Figure 1A:
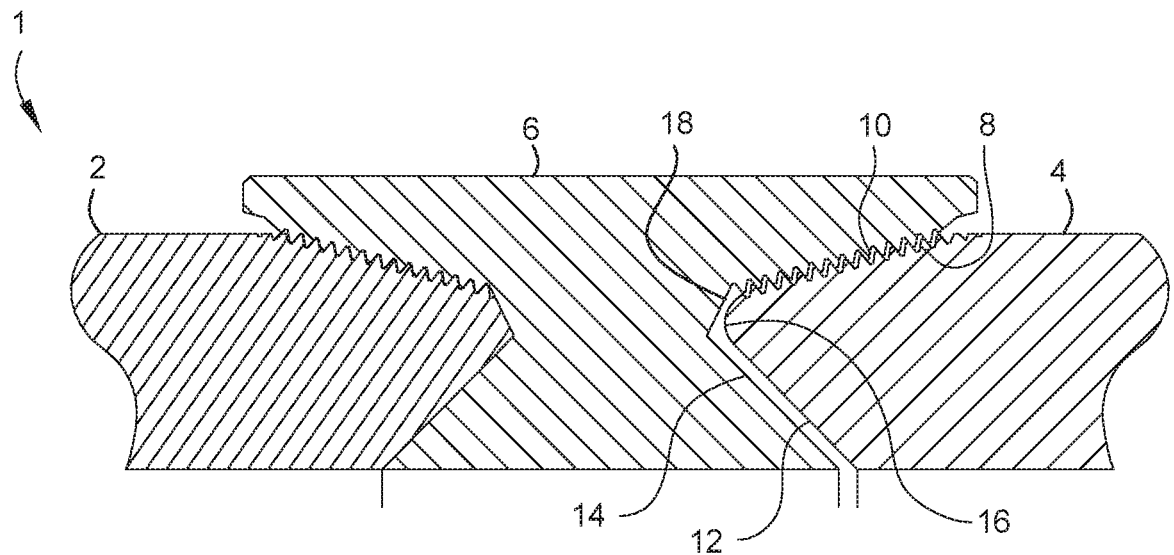
FIG. 1A is a partial cross-sectional view of a connection between threaded premium grade tubulars.

FIG. 1A illustrates a connection 1 between premium grade tubulars 2, 4. The tubulars 2, 4 may be any oil country tubular good, such as production tubing, casing, liner, or drill pipe. The connection 1 may include a first tubular 2 joined to a second tubular 4 through a tubular coupling 6. Each of the tubulars 2, 4 and the coupling 6 may be made from a metal or alloy, such as plain carbon steel, low alloy steel, high strength low alloy steel, stainless steel, or a nickel based alloy. The end of each tubular 2, 4 may have a tapered externally-threaded surface 8 (aka a pin) which co-operates with a correspondingly tapered internally-threaded surface (aka box) 10 on the coupling 6. Each tubular 2, 4 may be provided with a torque shoulder 12 which co-operates with a corresponding torque shoulder 14 on the coupling 6. At a terminal end of each tubular 2, 4, there may be defined an annular sealing area 16 which is engageable with a co-operating annular sealing area 18 defined between the tapered portions 10, 14 of the coupling 6. Alternatively, the sealing areas 16, 18 may be located at other positions in the connection 1 than adjacent the shoulders 12, 14.

Figure 1B:
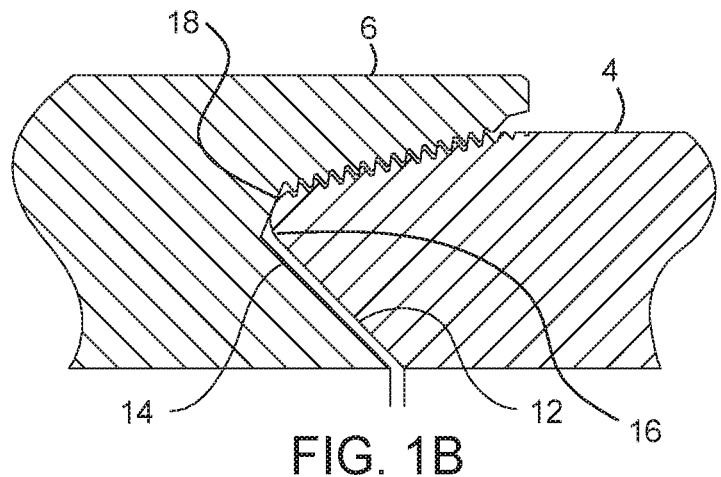
FIG. 1B is a partial cross-sectional view of a connection between threaded premium grade tubulars in a seal position formed by engagement between sealing surfaces.
Figure 1C:
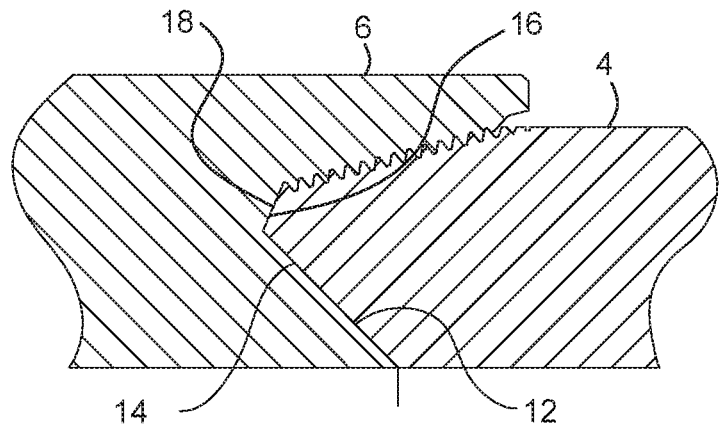
FIG. 1C is a partial cross-sectional view of a connection between threaded premium grade tubulars in a shoulder position formed by engagement between shoulder surfaces.

During makeup, the box 10 is engaged with the pin 8 and then screwed onto the pin by relative rotation therewith. During continued rotation, the annular sealing areas 16, 18 contact one another, as shown in FIG. 1B. This initial contact is referred to as the "seal position". As the tubular 2 is further rotated, the co-operating tapered torque shoulders 12, 14 contact and bear against one another at a machine detectable stage referred to as a "shoulder position", as shown in FIG. 1C. The increasing pressure interface between the tapered torque shoulders 12, 14 cause the seals 16, 18 to be forced into a tighter metal-to-metal sealing engagement with each other causing deformation of the seals 16 and eventually forming a fluid-tight seal.

Figure 2A:
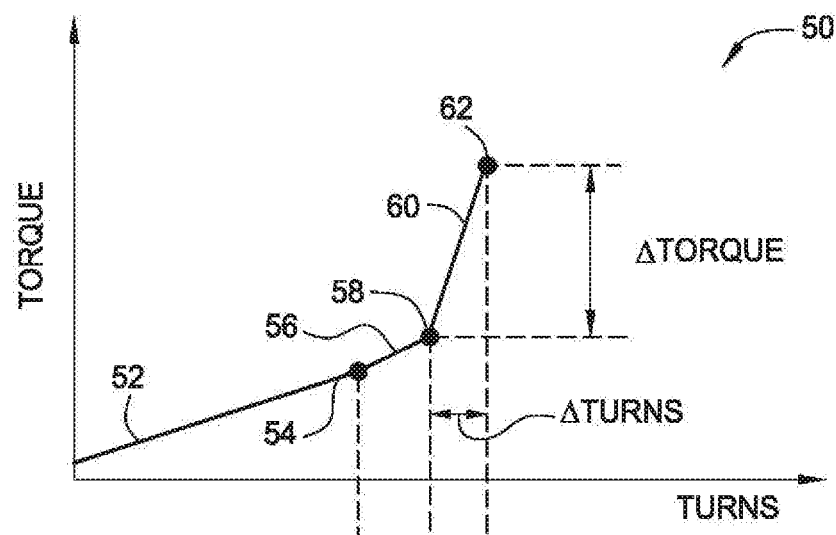
FIG. 2A illustrates an ideal torque-turns curve for the premium connection
Figure 2B:
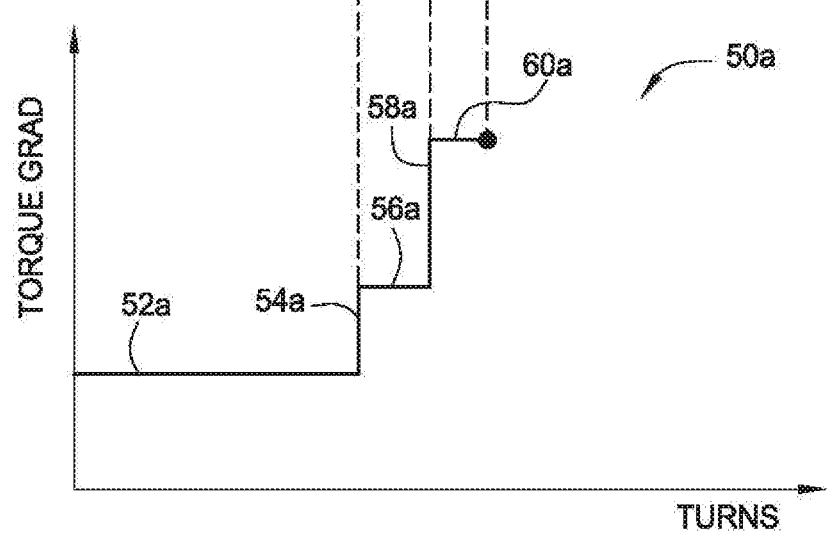
FIG. 2B illustrates an ideal torque gradient-turns curve for the premium connection.

FIG. 2A illustrates an ideal torque-turns curve 50 for the premium connection. FIG. 2B illustrates an ideal torque gradient-turns curve 50a for the premium connection. During makeup of the tubulars 2, 4, torque and turns measurements may be recorded and the curves 50, 50a displayed for evaluation by a technician. Shortly after the coupling 6 engages the tubular 2 and torque is applied, the measured torque increases linearly as illustrated by curve portion 52. As a result, corresponding curve portion 52a of the differential curve 50a is flat at some positive value.

During continued rotation, the annular sealing areas 16, 18 contact one another causing a slight change (specifically, an increase) in the torque rate, as illustrated by point 54. Thus, point 54 corresponds to the seal position shown in FIG. 1B and is plotted as the first step 54a of the differential curve 50a. The torque rate then again stabilizes resulting in the linear curve portion 56 and the plateau 56a. In practice, the seal condition (point 54) may be too slight to be detectable. However, in a properly behaved makeup, a discernable/detectable change in the torque rate occurs when the shoulder position is achieved (corresponding to FIG. 1C), as represented by point 58 and step 58a. The torque rate then again increases linearly as illustrated by curve portion 60 and the plateau 60a until makeup of the connection is terminated at final torque 62.

Figure 3A:
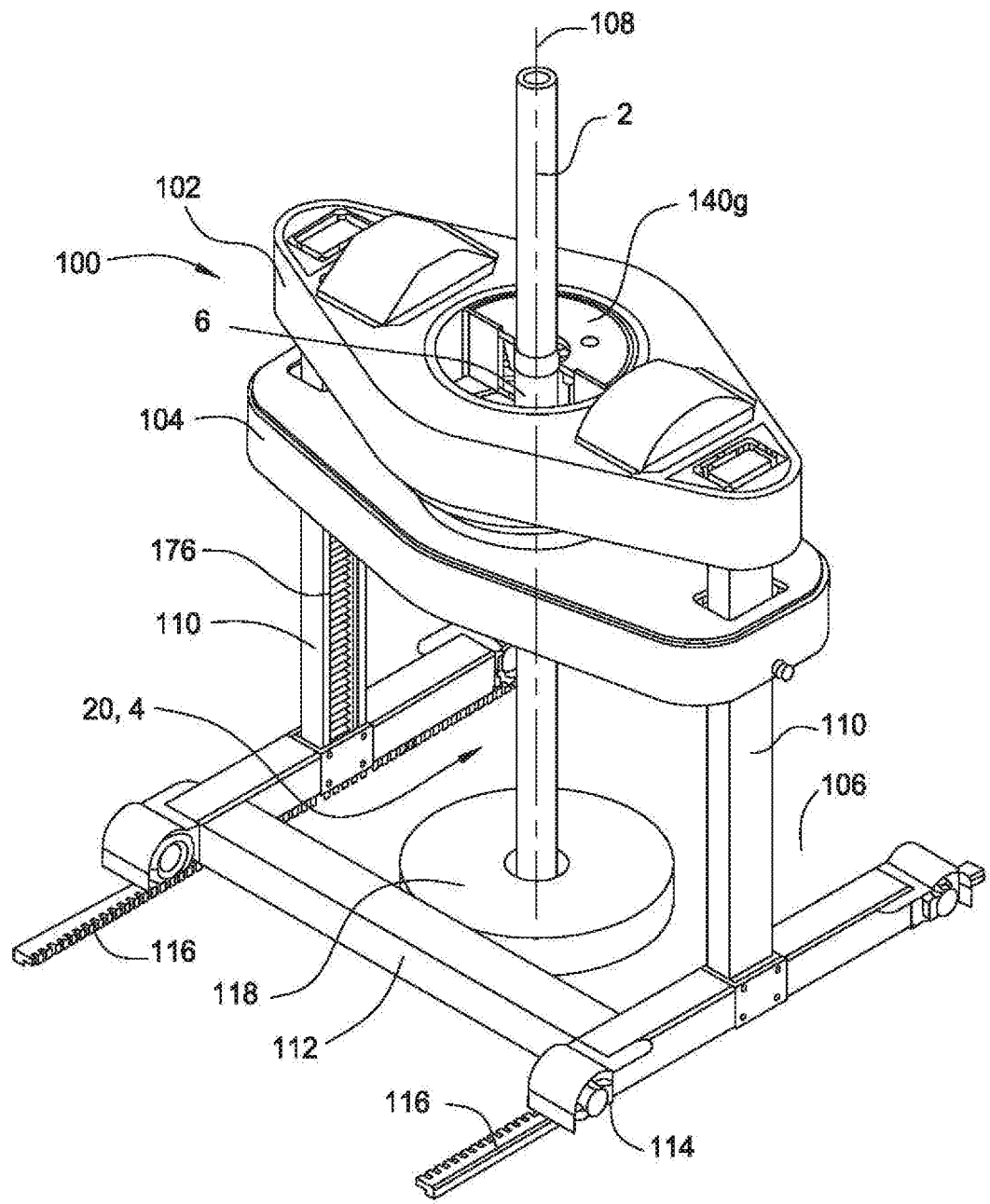
FIG. 3A is a perspective view of a tong assembly in an upper position.

FIG. 3A is a perspective view of a makeup tool, such as tong assembly 100, in an upper position. A group 140g of clamps has been removed for illustrative purposes. The tong assembly 100 may include a power tong 102 and a back-up tong 104 located on a drilling rig 106 coaxially with a drilling center 108 of the drilling rig 106. The assembly 100 may be coupled in a vertically displaceable manner to one or more guide columns 110 (two shown) arranged diametrically opposite each other relative to the drilling center 108. The guide columns 110 may be connected to a chassis 112 which by wheels 114 and hydraulic motors (not shown) may be displaced horizontally on rails 116 connected to the drilling rig 106. In the operative position, the assembly 100 may be located immediately above the slips 118 of the drilling rig 106.

The power tong 102 may include a power tong housing provided with a through aperture that corresponds to the guide columns 110, and an undivided drive ring connected via a bearing ring (not shown). The bearing ring may have a toothed ring (not shown) in mesh with cogwheels (not shown) on one or more hydraulic motors (not shown), such as two. One of the motors may be a spinner motor (high speed, low torque) and the other motor may be one or more torque motors (high torque, low speed). The toothed ring may be coupled to the drive ring by screw-bolt-joints (not shown). The hydraulic motors may be arranged to rotate the drive ring about the drilling center 108. The two hydraulic motors may be disposed on diametrically opposite sides of the drive ring. A cover may be provided to cover the power tong housing.

In the drive ring and co-rotating with this may be two crescent-shaped groups 140g (only one shown) of clamps. A turns counter may be configured to measure the rotation of the clamps. Each group 140g of clamps may be provided with one or more, such as three, clamps distributed around the drilling center 108. Each clamp may include a cylinder block provided with one or more, such as three, cylinder bores arranged in a vertical row. In each cylinder bore may be a corresponding longitudinally displaceable piston that seals against the cylinder bore by a piston gasket. A rear gasket may prevent pressurized fluid from flowing out between the piston and the cylinder bore at the rear end of the piston.

The pistons may be fastened to the housing of the group 140g of clamps by respective screw-bolt-joints. On the part of the cylinder block facing the drilling center 108 there may be provided a gripper. The gripper may be connected to the cylinder block by fastening, such as with dovetail grooves or screw-bolt-joints (not shown). Surrounding the drive ring there may be provided a swivel ring that seals by swivel gaskets, the swivel ring may be stationary relative to the power tong housing. The swivel ring may have a first passage that communicates with the plus side of the pistons via a first fluid connection, a second passage that communicates with the minus side of the pistons via a second fluid connection, and a further passage. The cylinder and the piston may thereby be double acting. The swivel ring, swivel gaskets and drive ring may together form a swivel coupling.

The backup tong 104 may also include the clamp groups. The back-up tong 104 may further include a back-up tong housing with guides 176 that correspond with the guide columns 110, and a retainer ring for two groups of clamps. At the guides 176 there may be cogwheels that mesh with respective pitch racks of the guide columns 110. Separate hydraulic motors may drive the cogwheels via gears. A pair of hydraulic cylinders may be arranged to adjust the vertical distance between the power tong 102 and the back-up tong 104.

In operation, when the tubular joint 2 is to be added to tubular string 20 (already including tubular joint 4), the assembly 100 may be displaced vertically along the guide columns 110 by the hydraulic motors, the gears, the cogwheels and the pitch racks until the back-up tong 104 corresponds with the pin 8 of the tubular string 20. The box 10 of the coupling 6 may have been madeup to the pin 8 of the joint 4 offsite (aka bucking operation) before the tubulars 2, 4 are transported to the rig. Alternatively the coupling 6 may be bucked on the joint 2 instead of the joint 4. Alternatively, the coupling 6 may be welded to one of the tubulars 2, 4 instead of being bucked on.

The vertical distance between the back-up tong 104 and the power tong 102 may be adjusted so as to make the grippers correspond with the tubular 2. The clamps may be moved up to the tubular 2 by pressurized fluid flowing to the first passage in the swivel ring and on through the first fluid connection to the plus side of the pistons. The excess fluid on the minus side of the pistons may flow via the second fluid connection and the second passage back to a hydraulic power unit (not shown).

The grippers may then grip their respective pin or box while the hydraulic motors rotate the drive ring and the groups 140g of clamps about the drilling center 108, while at the same time constant pressure may be applied through the swivel ring to the plus side of the pistons. The power tong 102 may be displaced down towards the back-up tong 104 while the screwing takes place. After the desired torque has been achieved, the rotation of the drive ring may be stopped. The clamps may be retracted from the tubular string 20 by pressurized fluid being delivered to the minus side of the pistons via the swivel ring. The assembly 100 may be released from the tubular string 20 and moved to its lower position.

When a joint 2 is to be removed from the tubular string 20, the operation is performed in a similar manner to that described above. When tools or other objects of a larger outer diameter than the tubular string 20 are to be displaced through the assembly 100, the grippers may easily be removed from their respective clamps, or alternatively the groups 140g of clamps can be lifted out of the drive ring.

Alternatively, other types of tong assemblies may be used instead of the tong assembly 100.

Figure 3B:
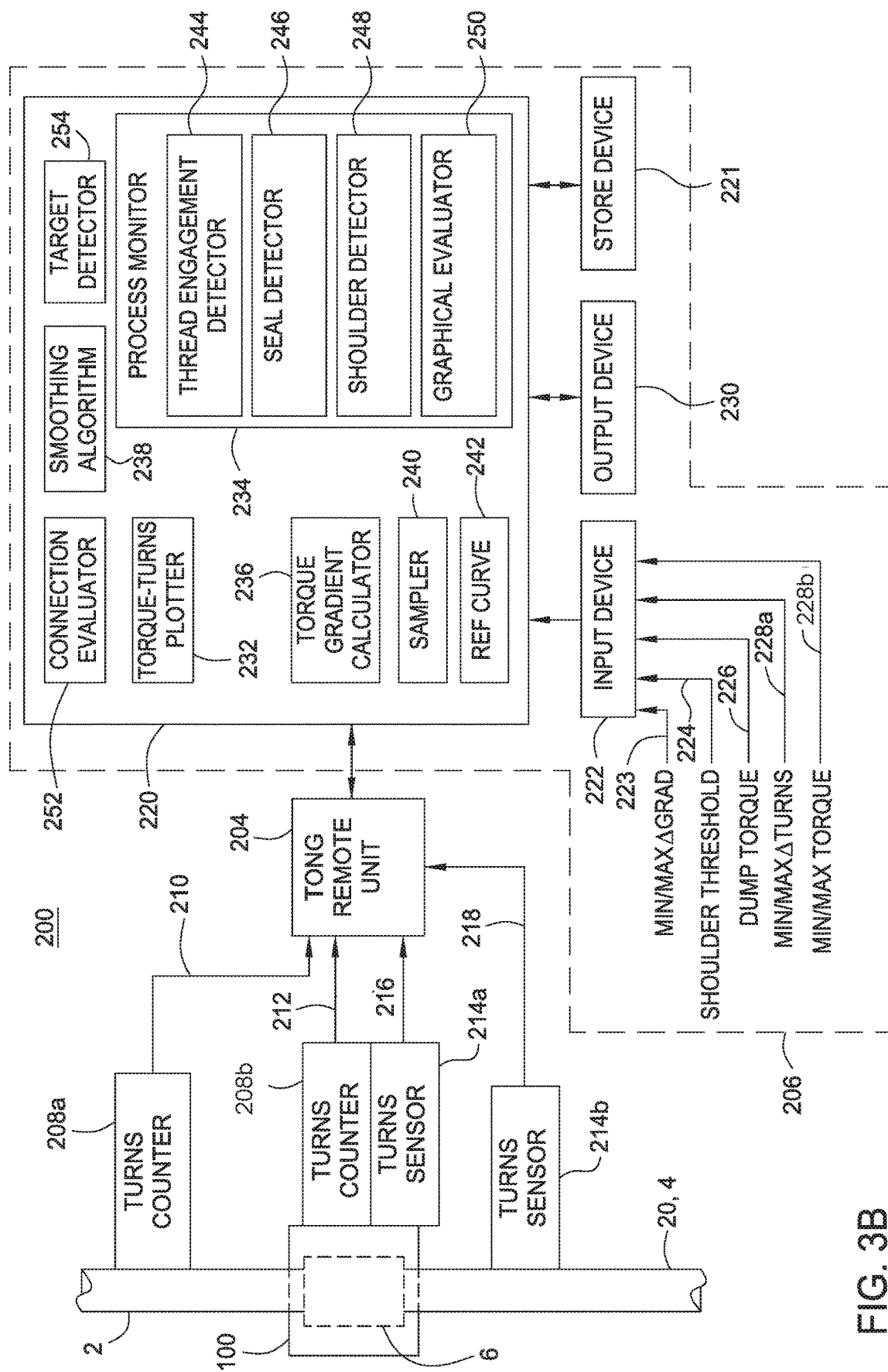
FIG. 3B is a block diagram illustrating a tubular makeup system.

FIG. 3B is a block diagram illustrating a tubular makeup system 200, according to one embodiment of the present invention. The tubular makeup system 200 may include the tong assembly 100, a tong remote unit (TRU) 204, a first turns counter 208a, a second turns counter 208b, a first turns sensor 214a, a second turns sensor 214b, a torque cell, and a control system 206.

The turns counters 208a,b may be mounted to the tong assembly 100 and communicatively coupled to the tong remote unit 204. The turns counters 208a,b may be any sensor capable of measuring rotation. The turns counters 208a,b may be contactless turns counters. For example, the turns counters 208a,b may be an optical camera based sensor or a laser based sensor. Alternatively, the turns counters 208a,b may be configured to contact a surface to be measured for rotation. For example, the turns counters 208a,b may be a friction wheel sensor. The first turns counter 208a may be configured to measure turns of the tubular 2. The first turns counter 208a may be configured to measure the rotation at any point along the tubular 2. For example, the first turns counter 208a may be configured to measure rotation at a point along tubular 2 above where the clamps of the tong assembly 100 engage the tubular 2. The first turns counter 208a may be configured to output a turns count signal 210. The second turns counter 208b may be configured to measure turns of the clamp 140g of the tong assembly 100. The second turns counter 208b may be configured to measure the rotation at any point along the clamp 140g. The second turns counter 208b may be configured to output a turns count signal 212.

The turns sensors 214*a,b* may be mounted to the tong assembly 100 and communicatively coupled to the tong remote unit 204. The turns sensors 214*a,b* may be any sensor capable of detecting rotation. The turns sensors 214*a,b* may be contactless turns detectors. For example, the turns sensors 214*a,b* may be an optical camera based sensor or a laser based sensor. Alternatively, the turns sensors 214*a,b* may be configured to contact a surface to detect rotation at the surface. For example, the turns sensors 214*a,b* may be a friction wheel detector. The first turns sensor 214*a* may be configured to detect rotation of the tubular coupling 6. The first turns sensor 214*a* may be configured to detect rotation of the tubular coupling 6 relative to the tubular 4. The first turns sensor 214*a* may be configured to detect rotation at any point along the tubular coupling 6. The first turns sensor 214*a* may be configured to output a turns detection signal 216. The second turns sensor 214*b* may be configured to detect rotation of the second tubular 4. The second turns sensor 214*b* may be configured to detect rotation of the second tubular 4 relative to the backup tong 104. The second turns sensor 214*b* may be configured to detect rotation at any point along the second tubular 4. The second turns sensor 214*b* may be configured to output a turns detection signal 218. The control system may communicate with the TRU 204 via an interface. Depending on sophistication of the TRU 204, the interface may be analog or digital. Alternatively, the control system 206 may also serve as the TRU.

A programmable logic controller (PLC) 220 of the control system 206 may monitor the turns count signals 210, 212 and turn detection signals 216, 218 from the respective sensors 208*a,b*, 214*a,b* along with torque values from the torque cell and compare the measured values of these signals with predetermined values 223-228*b*. In aspects, the PLC 220 may be any type of embedded computer device, for example, the PLC 220 may be replaced by a microcontroller unit (MCU), field programmable gate array (FPGA), application specific integrated circuit (ASIC), application specific instruction set processor (ASIP), digital signal processor (DSP), etc. The predetermined values 223-228*b* may be input by a technician for a particular connection. The predetermined values 223-228*b* may be input to the PLC 220 via an input device 222, such as a keypad or any touch sensitive display.

Illustrative predetermined values 223-228*b* which may be input, by an technician or otherwise, include minimum and maximum delta gradient values 223, a shoulder threshold gradient 224, a dump torque value 226, minimum and maximum delta turns values 228*a*, minimum and maximum torque values 228*b*, and reference curve data 242. The minimum and maximum torque values 228*b* may include a set for the shoulder position and a set for the final position. The torque values 228*b* may be derived theoretically, such as by finite element analysis, or empirically, such as by laboratory testing and/or analysis of historical data for a particular connection. The dump torque value 226 may simply be an average of the final minimum and maximum torque values 228*b*. During makeup of the connection 1, various outputs may be observed by a technician on output device, such as a video monitor, which may be one of a plurality of output devices 230. A technician may observe the various predefined values which have been input for a particular connection. Further, the technician may observe graphical information such as the torque rate curve 50 and the torque rate differential curve 50*a*. The plurality of output devices 230 may also include a printer such as a strip chart recorder or a digital printer, or a plotter, such as an x-y plotter, to provide a hard copy output. The plurality of output devices 230 may further include an alarm, such as a horn or other audio equipment, to alert the technician of significant events occurring during makeup, such as the shoulder position, termination, and/or a violation of a criterion.

Upon the occurrence of a predefined event(s), the PLC 220 may output a dump signal to the TRU 204 to automatically shut down or reduce the torque exerted by the tong assembly 100. For example, dump signal may be issued in response to the measured torque value reaching the dump torque 226 and/or a bad connection.

The comparison of measured turn count values and torque values with respect to predetermined values is performed by one or more functional units of the PLC 220. The functional units may generally be implemented as hardware, software or a combination thereof. The functional units may include one or more of a torque-turns plotter algorithm 232, a process monitor 234, a torque gradient calculator 236, a smoothing algorithm 238, a sampler 240, a database 242 of reference curves, a connection evaluator 252, and a target detector 254. The process monitor 234 may include one or more of a thread engagement detection algorithm 244, a seal detection algorithm 246, a shoulder detection algorithm 248, and a graphical evaluator algorithm 250. Alternatively, the functional units may be performed by a single unit. As such, the functional units may be considered logical representations, rather than well-defined and individually distinguishable components of software or hardware.

In operation, one of the threaded members (e.g., tubular 2) is rotated by the power tong 102 while the other threaded member (e.g., tubular 4 and coupling 6) is held by the backup tong 104. The applied torque and rotation are measured at regular intervals throughout the makeup. The frequency with which torque and rotation are measured may be specified by the sampler 240. The sampler 240 may be configurable, so that a technician may input a desired sampling frequency. The torque and rotation values may be stored as a paired set in a buffer area of memory. Further, the rate of change of torque with respect to rotation (hereinafter "torque gradient") may be calculated for each paired set of measurements by the torque gradient calculator 236. The smoothing algorithm 238 may operate to smooth the torque-turns curve 50 and/or torque gradient curve 50*a* (e.g., by way of a running average). These values (torque, rotation, and torque gradient) may then be plotted by the plotter 232 for display on the output device 230.

The values (torque, rotation, and torque gradient) may then be compared by the connection evaluator 252, either continuously or at selected events, with predetermined values, such as the values 223-228*b*. Based on the comparison of the measured and/or calculated values with the predefined values 223-228*b*, the process monitor 234 may determine the occurrence of various events and the connection evaluator 252 may determine whether to continue rotation or abort the makeup. The thread engagement detection algorithm 244 may monitor for thread engagement of the pin 8 and box 10. Upon detection of thread engagement a first marker is stored. The marker may be quantified, for example, by time, rotation, torque, the torque gradient, or a combination of any such quantifications. During continued rotation, the seal detection algorithm 246 monitors for the seal condition. This may be accomplished by comparing the calculated torque gradient with a predetermined threshold seal condition value. A second marker indicating the seal condition may be stored if/when the seal condition is detected. At this point, the torque value at the seal condition may be evaluated by the connection evaluator 252.

For example, a determination may be made as to whether the turns value and/or torque value are within specified limits. The specified limits may be predetermined, or based off of a value measured during makeup. If the connection evaluator 252 determines a bad connection, rotation may be terminated. Otherwise, rotation continues and the shoulder detection algorithm 248 monitors for the shoulder position. This may be accomplished by comparing the calculated torque gradient with the shoulder threshold gradient 224. When the shoulder position is detected, a third marker indicating the shoulder position is stored. The connection evaluator 252 may then determine whether the torque value at the shoulder position is acceptable by comparing to the respective input torque values 228b.

Upon continuing rotation, the target detector 254 compares the measured torque to the dump torque value 226. Once the dump torque value 226 is reached, rotation may be terminated by sending the dump signal. Alternatively, the dump signal may be issued slightly before the dump torque 226 is reached to account for system inertia. Once the connection is complete, the connection evaluator 252 may calculate a delta turns value based on the difference between the final turns value and the turns value at the shoulder condition. The connection evaluator 252 may compare the delta turns value with the input delta turns values 228a. Similarly, the connection evaluator may compare the final torque value to the respective input torque values 228b. The connection evaluator 252 may calculate a delta torque value based on the difference between the final torque value and the torque value at the shoulder condition. The connection evaluator 252 may calculate a delta gradient value using delta torque and delta turns values and compare it with the respective input values 223. If either criterion is not met, then the connection evaluator 252 may indicate a bad connection.

Alternatively, a delta turns value may be entered instead of the dump torque 226. The target detector 254 may then calculate a target turns value using the shoulder turns and the delta turns value (target turns equals shoulder turns plus delta turns).

As mentioned above, the example tubular makeup system 200 includes predetermined values 223-228b input by a technician or operator. Wrong inputs of the measured values may lead to incorrect calculated torque values which, in turn, may lead to under torque or over torque, and may be without any warning. In order to reduce the possibility of human error and to increase efficiency, it is desirable to automate the process of monitoring threaded connections, evaluating the quality of threaded connections, and controlling the assembly system.

The PLC 220 of the control system 206 may compare the turns count signals 210, 212. The comparison between turns count signal 210 and turns count signal 212 is performed by one or more functional units of the PLC 220. The functional units may include one or more of the torque-turns plotter algorithm 232, the process monitor 234, the torque gradient calculator 236, the smoothing algorithm 238, the sampler 240, the database 242 of reference curves, the connection evaluator 252, and the target detector 254. Alternatively, the functional units may be performed by a single unit. As such, the functional units may be considered logical representations, rather than well-defined and individually distinguishable components of software or hardware.

In operation, one of the threaded members (e.g., tubular 2) is rotated by the power tong 102 while the other threaded member (e.g., tubular 4 and coupling 6) is held by the backup tong 104. The rotation of the tubular 2 and clamp 104g are measured and rotation of the tubular 4 and coupling 6 are detected at regular intervals throughout the makeup. The frequency with which the rotation is measured and detected may be specified by the sampler 240. The sampler 240 may be configurable so that a technician may input a desired sampling frequency. The measured rotation values of the tubular 2 and clamp 104g may be stored as a paired set in a buffer area of memory.

The measured turns values of the tubular 2 and clamp 104g may then be compared by the connection evaluator 252, either continuously or at selected events. Based on the comparison between the measured turns values of the tubular 2 and clamp 104g, the process monitor 234 may determine the occurrence of various events and the connection evaluator 252 may determine whether to continue rotation or abort the makeup. For example, the process monitor 234 may determine if a first type of slippage event occurred based on the comparison between the measured turns values of the tubular 2 and clamp 104g. The process monitor 234 may compare the measured turns values of the tubular 2 and clamp 104g. Any difference between the measured turns values may indicate a slippage event occurred between the tubular 2 and the clamp 104g during the makeup operation.

A second type of slippage event may be evaluated based on the detected turns signals 216, 218. The detected turns signals of the coupling 6 and the tubular 4 may be evaluated by the connection evaluator 252, either continuously or at selected events. Based on the turns detection of the coupling 6 and the tubular 4, the process monitor 234 may determine the occurrence of various events and the connection evaluator 252 may determine whether to continue rotation or abort the makeup. For example, process monitor 234 may determine if a slippage event occurred between the tubular 4 and the coupling 6 based on a comparison between the detected turns signals of the coupling 6 and the tubular 4. The process monitor 234 may compare the detected turns signals to determine whether either of the coupling 6 and/or the tubular 4 rotated during the makeup operation. Detected turns of one of the coupling 6 or the tubular 4 may indicate a slippage event occurred during the makeup operation. A slippage event between the coupling 6 and the tubular 4 may be due to insufficient mill side makeup between the coupling 6 and the tubular 4.

A third type of slippage event may be evaluated based on the detected turns signal 218. The detected turns signal of the tubular 4 may be evaluated by the connection evaluator 252, either continuously or at selected events. Based on the turns detection of the tubular 4, the process monitor 234 may determine the occurrence of various events and the connection evaluator 252 may determine whether to continue rotation or abort the makeup. For example, process monitor 234 may determine if a slippage event occurred between the tubular 4 and the backup tong 104 based on a detection of turns at the tubular 4 by the second turns sensor 214b. Detected turns of the tubular 4 may indicate a slippage event occurred between the tubular 4 and the backup tong 104 during the makeup operation.

If any slippage event occurs, the connection evaluator 252 may evaluate the connection. The connection evaluator 252 may evaluate the slippage event(s) based on the measured turns values, the difference between the measured turns values, the number of slippage events, the type of each slippage event, and when the slippage event(s) happened. For example, the connection evaluator 252 may compare final measured turns values of the clamp 104g and the tubular 2. The connection evaluator 252 may determine whether slippage(s) occurred before or after the shoulder condition. If the connection evaluator 252 determines a bad connection, rotation may be terminated.

Although a tong system is described with respect to FIGS. 1A-3B, other systems can be used for tubular makeups, such as a top drive system. These systems can also include graphical evaluators for monitoring the connections.

Example Tubular Makeup System

Figure 4:
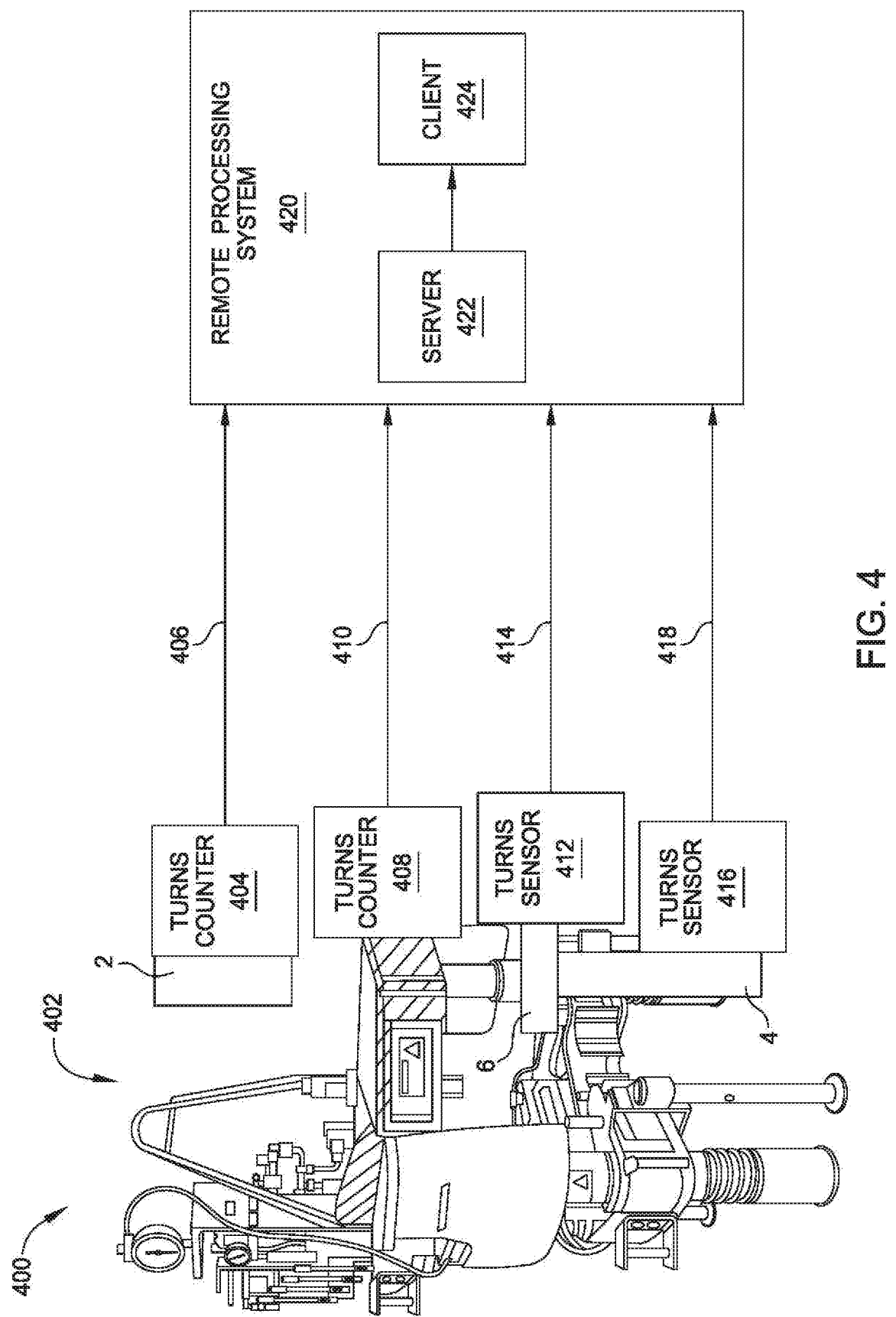
FIG. 4 illustrates an example tubular makeup system including a first turns counter and a second turns counter, in accordance with certain aspects of the present disclosure.

FIG. 4 illustrates an example tubular makeup system 400 including a first turns counter 404 and a second turns counter 408, in accordance with certain aspects of the present disclosure. Tubular makeup system 400 may include a power drive 402, a first turns counter 404, a second turns counter 408, a first turns sensor 412, a second turns sensor 416, and a remote processing system 420 (e.g., similar to tong remote unit 204 or control system 206) that includes a server 422 and a client 424.

The power drive 402 may be a tong assembly (e.g., similar to tong assembly 100), over drive system, or other makeup tool for connecting casing, tubulars, etc. The first turns counter 404 may be coupled to the power drive 402 and configured to measure turns of the first tubular 2 during makeup. The second turns counter 408 may be coupled to the power drive 402 and configured to measure turns of a clamp of the power drive 402 configured to engage the first tubular 2 during makeup.

The turns counters 404, 408 may include interfaces for communicating with another device. For example, the turns counters 404, 408 may include two-wire, 4-20 milliamp serial interfaces 406, 410 used for transmitting turns counter signals. The turns counters 404, 408 may be communicatively coupled with the remote processing system 420 via the interface. One example of the remote processing system 420 includes Joint Analysis and Makeup (JAM) devices, such as the JAMCompact™ torque monitoring system by Weatherford, Inc. The remote processing system 420 may also have an interface that supports serial communication on two channels.

The turns counters 404, 408 may send a 4-20 milliamp signal representing the measured turns over the interfaces 406, 410 to the remote processing system 420. For example, the 4-20 milliamp signal may be sent to the server 422. The turns data may be sent (e.g., permanently) during the makeup process to provide information regarding turns of the tubular 2 and turns of the clamp of the power drive 402. The server 422 may provide the turns data to the client 424. One example of the client 424 includes a JAM client, such as the TorkPro™ torque/turn analyzing software by Weatherford, Inc. The turns data may then be used to evaluate the connection, output a graphical display, make control decisions for power drive 402, etc.

The first turns sensor 412 may be coupled to the power drive 402 and configured to detect turns of the coupling 6 during makeup. The second turns sensor 416 may be coupled to the power drive 402 and configured to detect turns of the second tubular 4 during makeup.

The turns sensors 412, 416 may include interfaces for communicating with another device. For example, the turns sensors 412, 416 may include two-wire, 4-20 milliamp serial interfaces 414, 418 used for transmitting turns sensor signals. The turns sensors 412, 416 may be communicatively coupled with the remote processing system 420 via the interface.

The turns sensors 412, 416 may send a 4-20 milliamp signal representing the detected turns over the interfaces 414, 418 to the remote processing system 420. For example, the 4-20 milliamp signal may be sent to the server 422. The detected turns data may be sent (e.g., permanently) during the makeup process to provide information regarding detected turns of the coupling 6 and/or the second tubular 4. The server 422 may provide the detected turns data to the client 424. The detected turns data may then be used to evaluate the connection, output a graphical display, make control decisions for power drive 402, etc.

During the makeup process, the turns counters and turns sensors may send turns data via the 4-20 milliamp interfaces. The client 424 may use the measured turns data and detected turns data to evaluate a connection. In some cases, the client 424 may perform an automated evaluation. In some cases, the client 424 may output a display (e.g., a graphical display) and an operator/technician can evaluate the connection. An input control from the operator/technician or an automated control decision from the client 424 can be sent from the processing system 420 to the power drive 402. In one example, the client 424 may compare the measured turns data and detected turns data with job defined set points and create an error message to prevent a wrong set up.

According to certain aspects, the measured turns data and/or detected turns data can be sent from server 422 to the client 424 in response to a request. For example, the client 424 may send a request to the server 422 for the measured turns data and/or detected turns data and server 424 can send the measured turns data and/or detected turns data information in response to the request.

In one aspect, the server 422 may be a stand-alone computer. The server 422 may include a storage unit (e.g., similar to storage device 221) for storing data for operations, such as data for each makeup or break out. Alternatively, the server 422 may be a storage unit in the remote processing system 420. The client 424 may be a terminal computer that may be remote from the server 422, or could be the same computer. The client 424 may be a mobile unit, such as a tablet, that allows operations at flexible locations.

Figure 5:
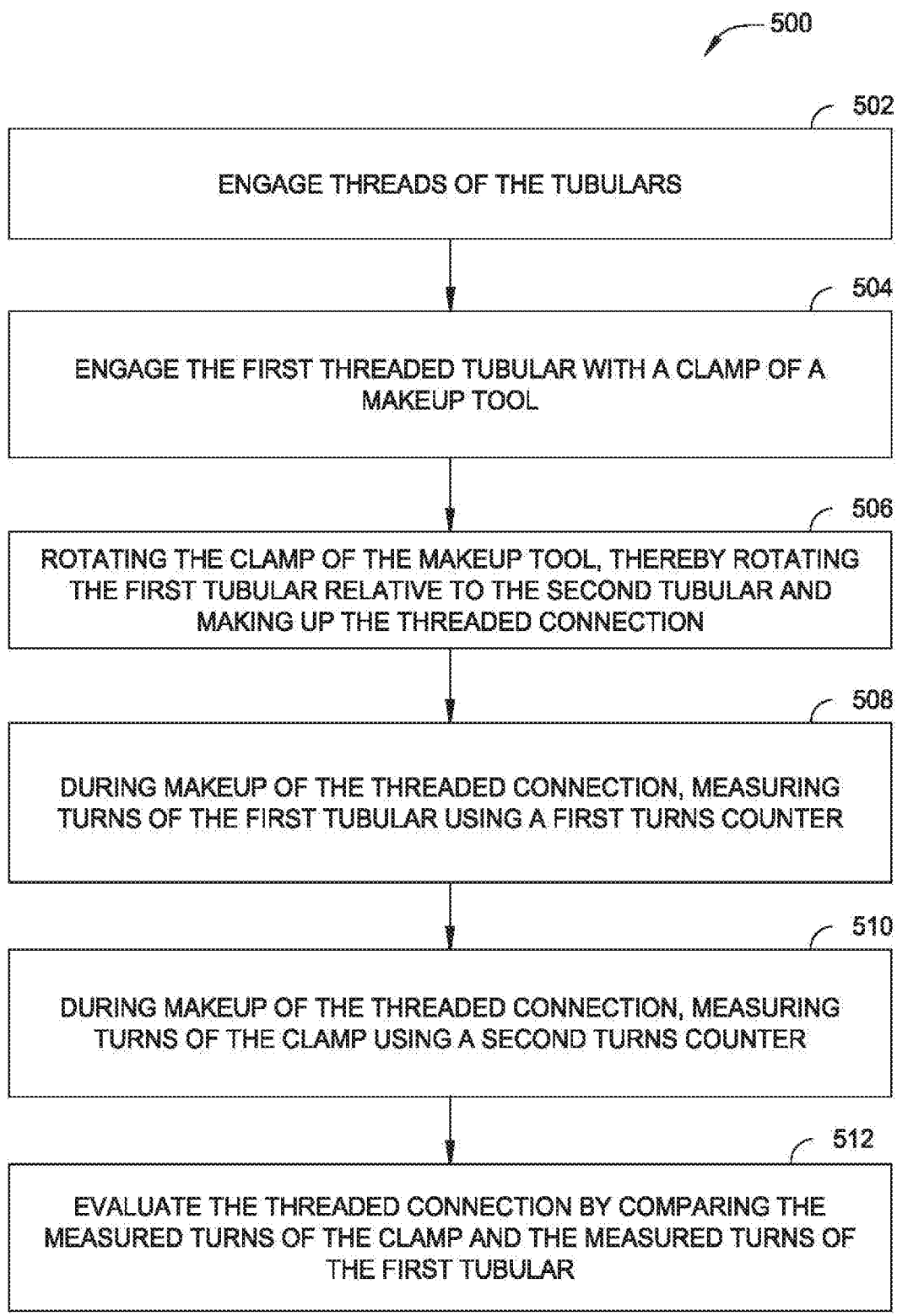
FIG. 5 is a flow diagram of example operations for evaluating a threaded connection, in accordance with certain aspects of the present disclosure.

FIG. 5 is a flow diagram illustrating example operations 500 for connecting a first threaded tubular to a second threaded tubular, in accordance with certain aspects of the present disclosure. The operations 500 may be performed by a tubular makeup system. At 502, the threads of the first threaded tubular may be engaged to threads of the second threaded tubular. At 504, the first threaded tubular may be engaged by a clamp of a makeup tool. At 506, the clamp is rotated, thereby rotating the first threaded tubular relative to the second threaded tubular and making up the threaded connection. At 508, during makeup of the threaded connection, turns data at the first tubular is measured using a first turns counter. At 510, during makeup of the threaded connection, turns data at the clamp of the makeup tool is measured using a second turns counter. At 512, the threaded connection is evaluated by comparing the measured turns data of the clamp and the measured turns data of the first tubular.

In some embodiments, operations 500 may further include during makeup of the threaded connection, the measured turns data at the first tubular is sent from the first turns counter (e.g., via the 4-20 milliamp interface) to the remote processing system. For example, the previous operations may precede block 512.

In some embodiments operations 500 may further include during makeup of the threaded connection, the measured turns data at the clamp of the makeup tool is sent from the second turns counter (e.g., via the 4-20 milliamp interface) to the remote processing system. For example, the previous operations may precede block 512.

In some embodiments, operations 500 may further include during makeup of the threaded connection, detecting turns of a tubular coupling using a first turns sensor. Sending, from the first turns sensor (e.g., via the 4-20 milliamp interface), the detected turns data to the remote processing system. Based on the detected turns of the tubular coupling, evaluating the threaded connection.

In some embodiments, operations 500 may further include engaging the second tubular with a second clamp of the makeup tool.

In some embodiments, operations 500 may further include during makeup of the threaded connection, detecting turns of the second tubular using a second turns sensor. Sending, from the second turns sensor (e.g., via the 4-20 milliamp interface), the detected turns data to the remote processing system. Based on the detected turns of the second tubular, evaluating the threaded connection.

In some embodiments, evaluating the threaded connection may further include determining whether a slippage event occurred between the clamp and the first tubular.

Figure 6:
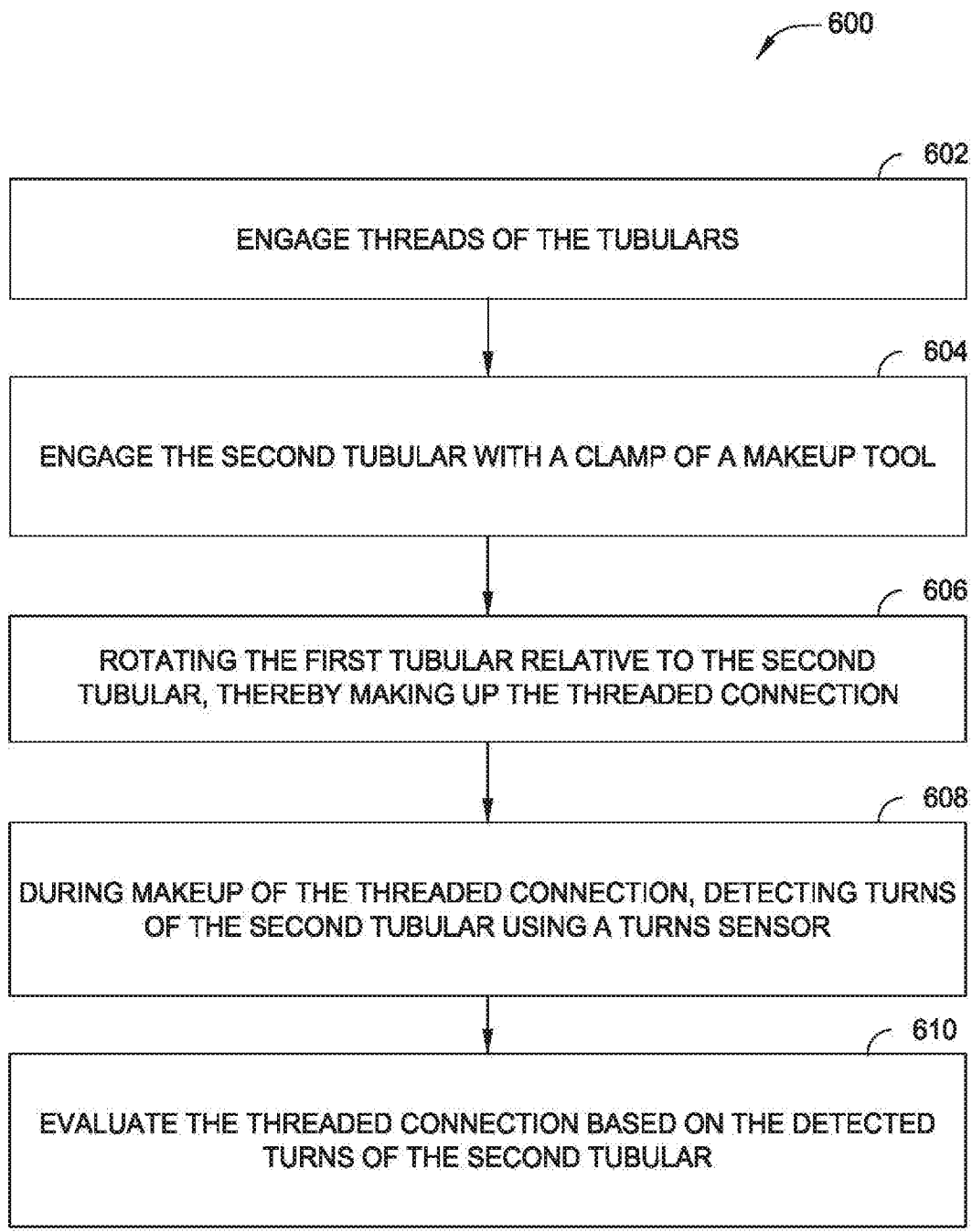
FIG. 6 is a flow diagram of example operations for evaluating a threaded connection, in accordance with certain aspects of the present disclosure.

FIG. 6 is a flow diagram illustrating example operations 600 for connecting a first threaded tubular to a second threaded tubular, in accordance with certain aspects of the present disclosure. The operations 600 may be performed by a tubular makeup system. At 602, the threads of the first threaded tubular may be engaged to threads of the second threaded tubular. At 604, the second threaded tubular may be engaged by a clamp of a makeup tool. At 606, the first threaded tubular is rotated relative to the second threaded tubular, thereby making up the threaded connection. At 608, during makeup of the threaded connection, turns data is detected at the second tubular using a turns sensor. At 610, the threaded connection is evaluated based on the detected turns data of the second tubular.

In some embodiments, operations 600 may further include during makeup of the threaded connection, sending, from the turns sensor, the detected turns data to the remote processing system. For example, the previous operations may precede block 610.

Figure 7:
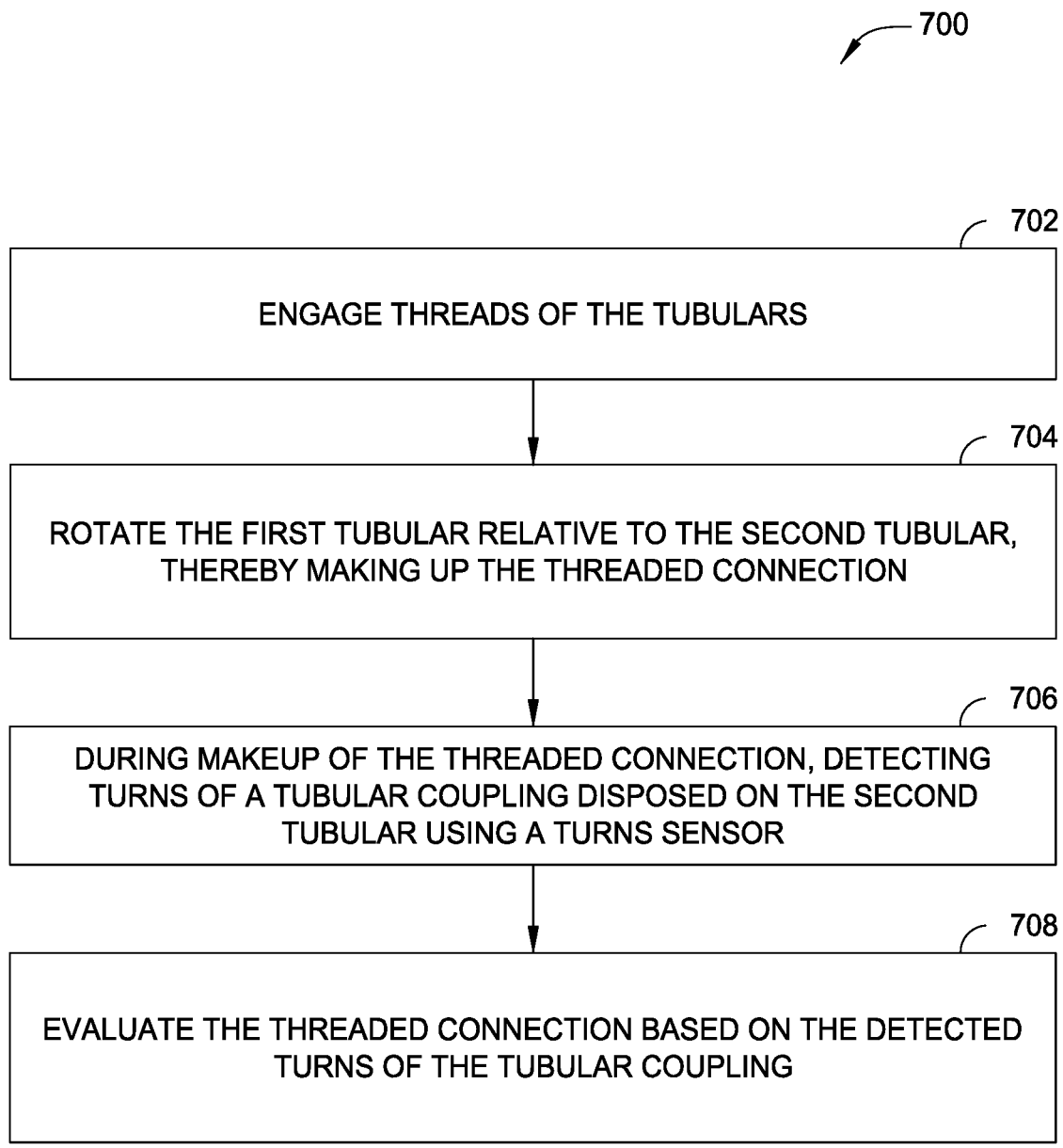
FIG. 7 is a flow diagram of example operations for evaluating a threaded connection, in accordance with certain aspects of the present disclosure.

FIG. 7 is a flow diagram illustrating example operations 700 for connecting a first threaded tubular to a second threaded tubular, in accordance with certain aspects of the present disclosure. The operations 700 may be performed by a tubular makeup system. At 702, the threads of the first threaded tubular may be engaged to threads of the second threaded tubular. At 704, the first threaded tubular is rotated relative to the second threaded tubular, thereby making up the threaded connection. At 706, during makeup of the threaded connection, turns data is detected at a tubular coupling disposed on the second tubular using a turns sensor. At 708, the threaded connection is evaluated based on the detected turns data of the tubular coupling.

In some embodiments, operations 700 may further include during makeup of the threaded connection, sending, from the turns sensor, the detected turns data to the remote processing system. For example, the previous operations may precede block 708.

Figure 8:
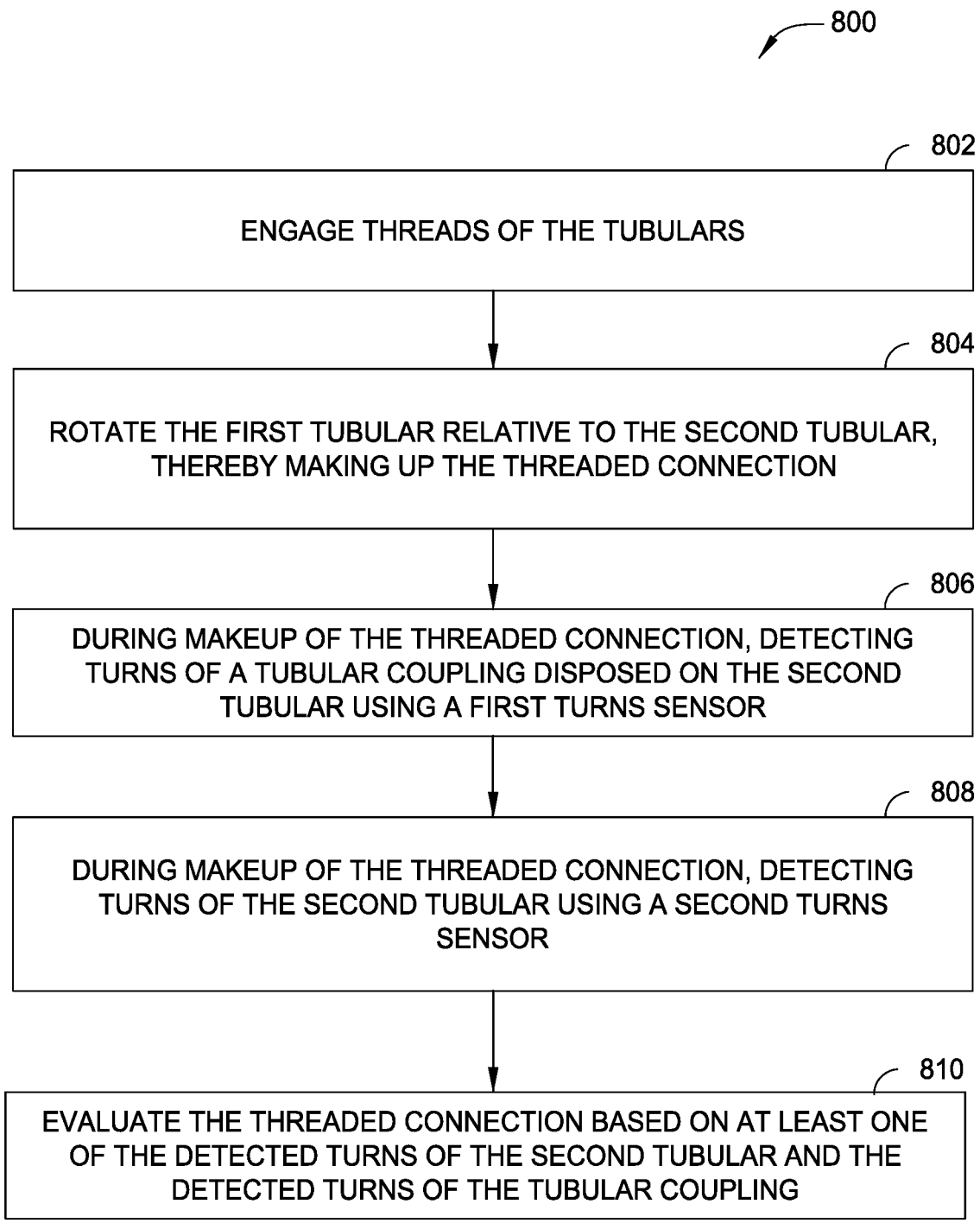
FIG. 8 is a flow diagram of example operations for evaluating a threaded connection, in accordance with certain aspects of the present disclosure.

FIG. 8 is a flow diagram illustrating example operations for connecting a first threaded tubular to a second threaded tubular, in accordance with certain aspects of the present disclosure. The operations 800 may be performed by a tubular makeup system. At 802, the threads of the first threaded tubular may be engaged to threads of the second threaded tubular. At 804, the first threaded tubular is rotated relative to the second threaded tubular, thereby making up the threaded connection. At 806, during makeup of the threaded connection, a first turns data is detected at a tubular coupling disposed on the second tubular using a first turns sensor. At 808, during makeup of the threaded connection, a second turns data is detected at the second tubular using a second turns sensor. At 810, the threaded connection is evaluated based on at least one of the detected turns of the tubular coupling and the detected turns of the second tubular.

In some embodiments, operations 800 may further include during makeup of the threaded connection, sending, from the first turns sensor, the detected turns data of the tubular coupling to the remote processing system. For example, the previous operations may precede block 810.

In some embodiments, operations 800 may further include during makeup of the threaded connection, sending, from the second turns sensor, the detected turns data of the second tubular to the remote processing system. For example, the previous operations may precede block 810.

Any of the operations described above, may be included as instructions in a non-transitory computer-readable medium for execution by the tong remote unit 204, control system 206, PLC 220, remote processing system 420, or any other processing system. The computer-readable medium may comprise any suitable memory for storing instruction, such as read-only memory (ROM), random access memory (RAM), flash memory, an electrically erasable programmable ROM (EEPROM), a compact disc ROM (CD-ROM), or a floppy disk.

In one or more of the embodiments described herein, a tubular makeup system includes: a makeup tool operable to rotate a first threaded tubular relative to a second threaded tubular, the makeup tool comprising: a clamp configured to: engage the first tubular; and rotate relative to the second tubular. The tubular makeup system includes: a first turns counter configured to measure turns of the first tubular; a second turns counter configured to measure turns of the clamp; and a programmable logic controller (PLC) operably connected to the makeup tool and communicatively coupled to the first turns counter and the second turns counter. The PLC is configured to control an operation, including: engaging threads of the tubular; engaging the first tubular with the clamp; rotating the clamp, thereby rotating the first tubular relative to the second tubular and making up a threaded connection; during makeup of the threaded connection: measuring turns of the first tubular; and measuring turns of the clamp; and evaluating the threaded connections by comparing the measured turns of the first tubular and the measured turns of the clamp.

In one or more of the embodiments described herein, the tubular makeup system includes a first turns sensor configured to detect turns of a tubular coupling disposed on the second tubular.

In one or more of the embodiments described herein, the tubular makeup system includes a second turns sensor configured to detect turns of the second tubular.

In one or more of the embodiments described herein, wherein the operation further includes: during makeup of the threaded connection: detecting turns of the tubular coupling; and detecting turns of the second tubular; and evaluating the threaded connection based on at least one of the detected turns of the tubular coupling and the detected turns of the second tubular.

In one or more of the embodiments described herein, the tubular makeup system further including a turns sensor configured to detect turns of the second tubular and the operation further including: during makeup of the threaded connection, detecting turns of the second tubular; and evaluating the threaded connection based on the detected turns of the second tubular.

In one or more of the embodiments described herein, wherein: the first turns counter is mounted to the makeup tool; and the second turns counter is mounted to the makeup tool.

In one or more of the embodiments described herein, wherein: the first turns sensor is mounted to the makeup tool; and the second turns sensor is mounted to the makeup tool.

In one or more of the embodiments described herein, wherein the makeup tool is a tong assembly.

In one or more of the embodiments described herein, wherein the operation further comprises engaging the second tubular with a second clamp of the makeup tool.

In one or more of the embodiments described herein, a tubular makeup system includes: a makeup tool operable to rotate a first tubular relative to a second tubular, the makeup tool comprising a clamp configured to engage the first tubular; a first turns counter configured to measure turns of the first tubular; and a second turns counter configured to measure turns of the clamp.

In one or more of the embodiments described herein, the tubular makeup system includes: a first turns sensor configured to detect turns of a tubular coupling disposed on the second tubular; and a second turns sensor configured to detect turns of the second tubular.

In one or more of the embodiments described herein, wherein the first turns counter is a contactless turns counter.

In one or more of the embodiments described herein, the tubular makeup system includes a remote processing system in communication with the first turns counter and the second turns counter, wherein the remote processing system is configured to evaluate a threaded connection between the first tubular and the second tubular.

In one or more of the embodiments described herein, the makeup tool further includes a second clamp configured to engage the second tubular.

In one or more of the embodiments described herein, a method of connecting a first threaded tubular to a second threaded tubular includes: engaging threads of the tubulars; engaging the first tubular with a clamp of a makeup tool; rotating the clamp of the makeup tool, thereby rotating the first tubular relative to the second tubular and making up the threaded connection; measuring turns of the first tubular; measuring turns of the clamp; and evaluating the threaded connection by comparing the measured turns of the first tubular and the measured turns of the clamp.

In one or more of the embodiments described herein, the method further includes: detecting turns of the second tubular; and evaluating the threaded connection based on the detected turns of the second tubular.

In one or more of the embodiments described herein, the method further includes: detecting turns of a tubular coupling disposed on the second tubular; and evaluating the threaded connection based on the detected turns of the tubular coupling.

In one or more of the embodiments described herein, the method further includes rejecting the threaded connection based on the evaluation.

In one or more of the embodiments described herein, the method further includes: detecting turns of the first tubular; detecting turns of a tubular coupling disposed on the second tubular; and evaluating the threaded connection based on at least one of the detected turns of the second tubular and the detected turns of the tubular coupling.

In one or more of the embodiments described herein, wherein the makeup tool is a tong assembly.

In one or more of the embodiments described herein, the method further including engaging the second tubular with a second clamp of a makeup tool.

While the foregoing is directed to embodiments of the present invention, other and further embodiments of the invention may be devised without departing from the basic scope thereof, and the scope thereof is determined by the claims that follow.

The invention claimed is:

1. A tubular makeup system, comprising:
a makeup tool operable to rotate a first threaded tubular relative to a second threaded tubular, the makeup tool comprising:
a clamp configured to:
engage the first tubular; and
rotate relative to the second tubular; and
a first turns counter configured to measure turns of the first tubular;
a second turns counter configured to measure turns of the clamp; and
a programmable logic controller (PLC) computer device operably connected to the makeup tool and communicatively coupled to the first turns counter and the second turns counter,
wherein the computer device is configured to control an operation, comprising:
engaging threads of the tubulars;
engaging the first tubular with the clamp;
rotating the clamp, thereby rotating the first tubular relative to the second tubular and making up a threaded connection;
during makeup of the threaded connection:
measuring turns of the first tubular; and
measuring turns of the clamp; and
evaluating the threaded connection by comparing the measured turns of the first tubular and the measured turns of the clamp.

2. The tubular makeup system of claim 1, further comprising:
a first turns sensor configured to detect turns of a tubular coupling disposed on the second tubular; and
a second turns sensor configured to detect turns of the second tubular.

3. The tubular makeup system of claim 2, wherein the operation further comprises:
during makeup of the threaded connection:
detecting turns of the tubular coupling; and
detecting turns of the second tubular; and
evaluating the threaded connection based on at least one of the detected turns of the tubular coupling and the detected turns of the second tubular.

4. The tubular makeup system of claim 3, wherein the operation further comprises engaging the second tubular with a second clamp of the makeup tool.

5. The tubular makeup system of claim 2, wherein:
the first turns sensor is mounted to the makeup tool; and
the second turns sensor is mounted to the makeup tool.

6. The tubular makeup system of claim 1, further comprising:
a turns sensor configured to detect turns of the second tubular; and
the operation further comprising:
during makeup of the threaded connection, detecting turns of the second tubular; and
evaluating the threaded connection based on the detected turns of the second tubular.

7. The tubular makeup system of claim 1, wherein:
the first turns counter is mounted to the makeup tool; and
the second turns counter is mounted to the makeup tool.

8. The tubular makeup system of claim 1, wherein the makeup tool is a tong assembly.

9. The tubular makeup system of claim 1, the makeup tool further comprising a second clamp configured to engage the second tubular.

10. The method of claim 1, wherein rotating the first tubular relative to the second tubular comprises rotating the first tubular relative to a coupling of the second tubular.

11. A method of connecting a first threaded tubular to a second threaded tubular, comprising:
    engaging threads of the tubulars;
    engaging the first tubular with a clamp of a makeup tool;
    engaging the second tubular with a second clamp of the makeup tool;
    rotating the clamp of the makeup tool, thereby rotating the first tubular relative to the second tubular and making up the threaded connection;
    measuring turns of the first tubular;
    measuring turns of the clamp while rotating the first tubular;
    detecting turns of the second tubular relative to the second clamp; and
    evaluating the threaded connection by comparing the measured turns of the first tubular and the measured turns of the clamp and the detected turns of the second tubular.

12. The method of claim 11, further comprising:
    detecting turns of the second tubular; and
    evaluating the threaded connection based on the detected turns of the second tubular.

13. The method of claim 11, further comprising:
    detecting turns of a tubular coupling disposed on the second tubular; and
    evaluating the threaded connection based on the detected turns of the tubular coupling.

14. The method of claim 11, further comprising rejecting the threaded connection based on the evaluation.

15. The method of claim 11, further comprising:
    detecting turns of the second tubular;
    detecting turns of a tubular coupling disposed on the second tubular; and
    evaluating the threaded connection based on at least one of the detected turns of the second tubular and the detected turns of the tubular coupling.

16. The method of claim 11, wherein the makeup tool is a tong assembly.

17. The method of claim 11, further comprising:
    detecting turns of a tubular coupling disposed on the second tubular; and
    evaluating the threaded connection based on the detected turns of the tubular coupling.

18. The method of claim 11, further comprising rejecting the threaded connection based on the evaluation.

* * * * *